Oct. 10, 1961     A. D. SMITH     3,003,374
HYDRAULIC ROLL PRESSURE CONTROL SYSTEM
Filed May 17, 1956     4 Sheets-Sheet 1

INVENTOR
ARTHUR DEAN SMITH

BY *James E. Toomey*
ATTORNEY

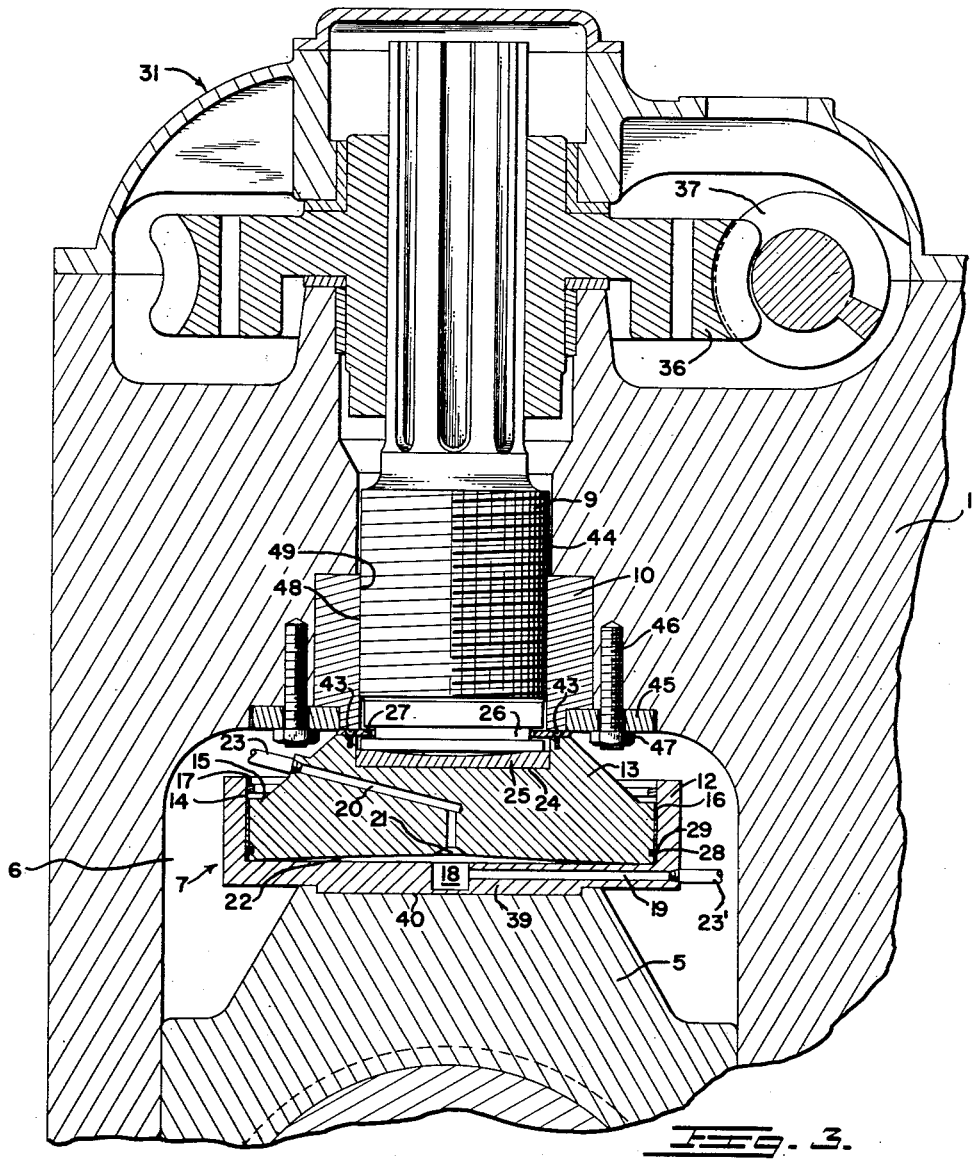

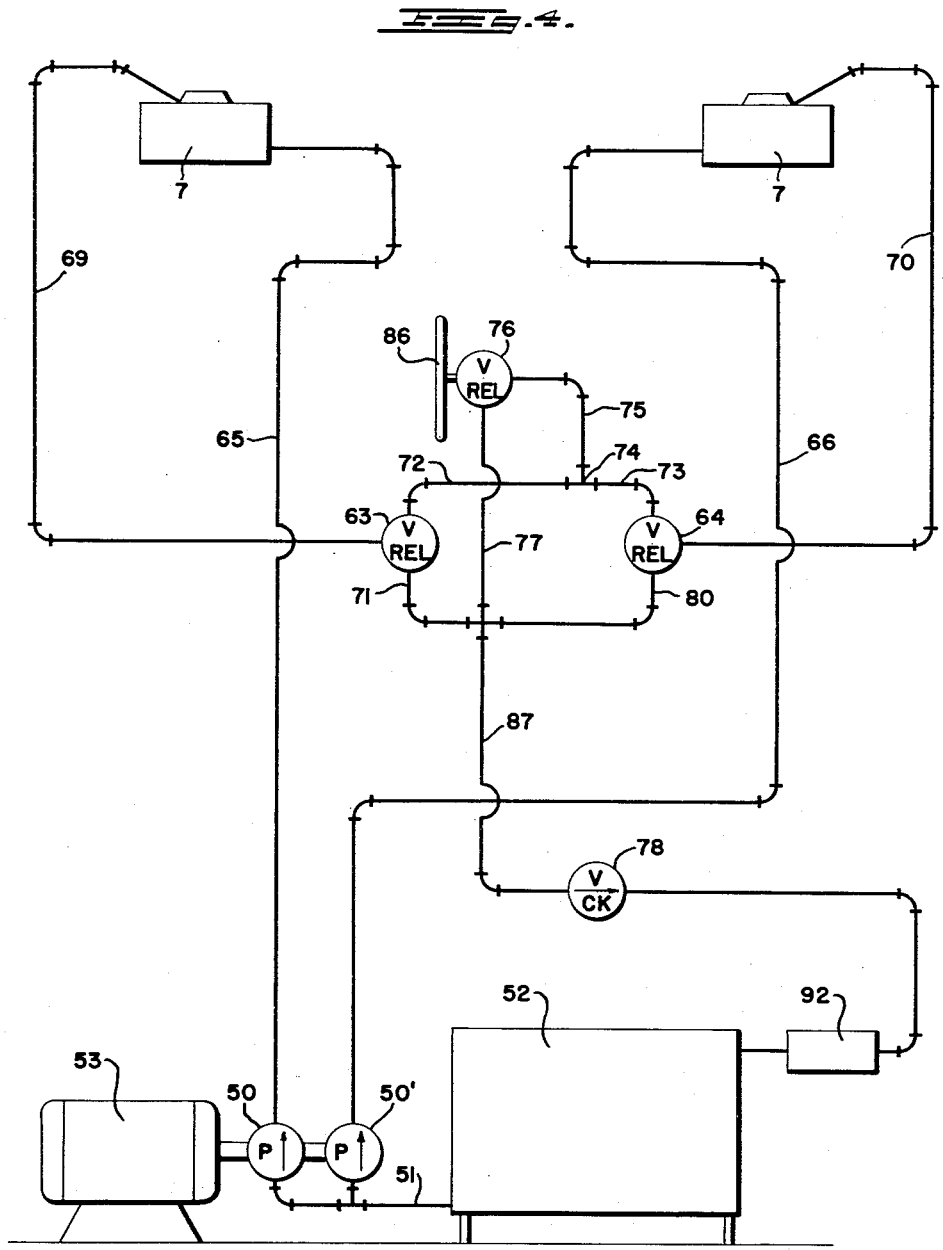

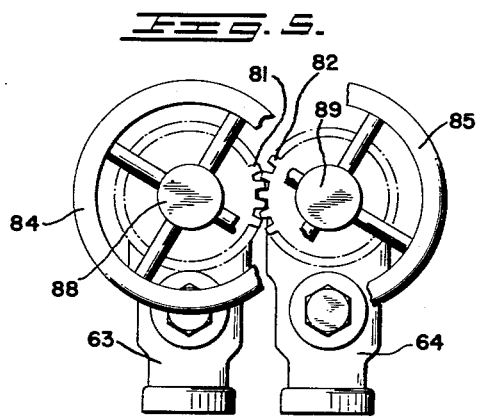
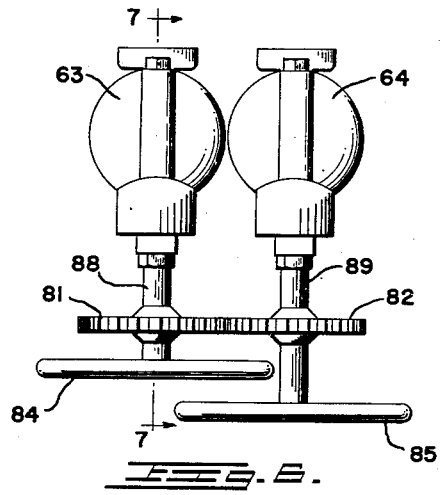
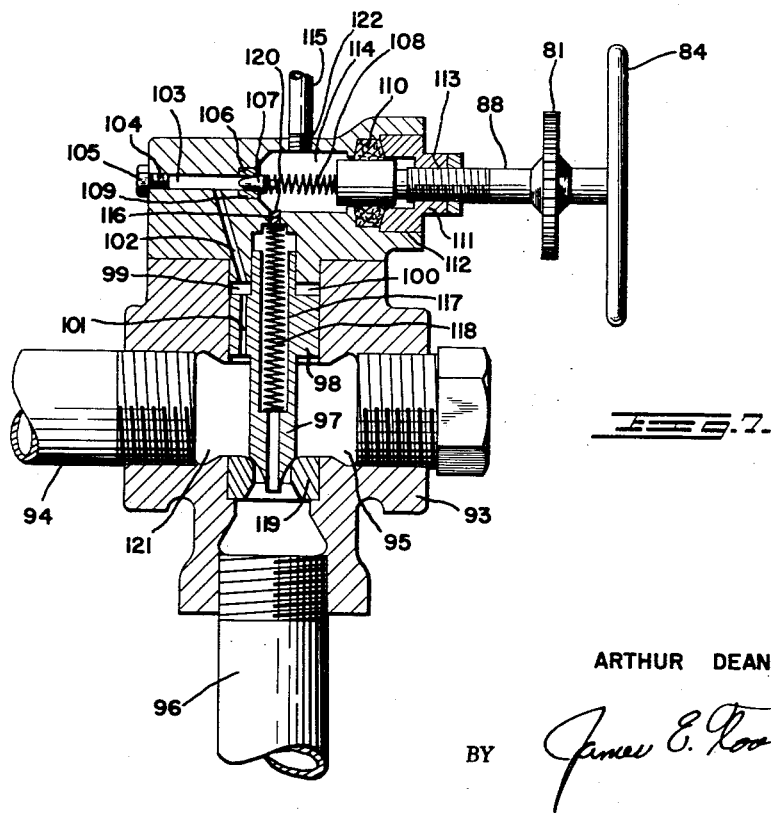

United States Patent Office 3,003,374
Patented Oct. 10, 1961

3,003,374
HYDRAULIC ROLL PRESSURE CONTROL SYSTEM
Arthur Dean Smith, San Lorenzo, Calif., assignor to Kaiser Aluminum & Chemical Corporation, Oakland, Calif., a corporation of Delaware
Filed May 17, 1956, Ser. No. 585,523
2 Claims. (Cl. 80—56)

This invention relates to the rolling of sheet material in a rolling mill. More particularly this invention relates to a novel means for actuating the rolls of a rolling mill to control the overall pressure and the differential between the pressures exerted on either side of the sheet material by the rolls.

In normal rolling operations it is customary to control the pressure exerted between the rolls by screw down means which exert pressure on the bearings on each side of the mill assembly. Each screw down assembly is generally comprised of a threaded device driven through suitable gearing by a motor manually controlled through the medium of a control switch. Such practice possesses certain inherent disadvantages with regard to control of rolling pressures under varying conditions. When employing such prior art practice the rolling pressures are constant for given conditions of bearing and roll oil film thickness and roll size. However, an increase in roll speed correspondingly increasing the oil film thickness will cause a corresponding change in rolling pressure. Similarly a change in roll temperature due to changes in amount of reduction, size of ingot, alloys, etc., with resultant change in roll diameter will also cause a corresponding change in rolling pressure. These changes in pressure must be compensated for through adjustment of the screw down means by the mill operator.

In view of the fact that accurate reduction of the metal being rolled is dependent to a large extent on accurate control of rolling pressure the necessity for adjusting and readjusting the roll position through the adjustment of the screw down means is undesirable. This is particularly disadvantageous since a time interval is required for the mill operator to make such adjustments whereby metal of incorrect thickness may be rolled during the adjusting time. In addition with the prior art devices, it is difficult to increase pressure on one side of the mill while simultaneously making a proportional decrease in pressure on the other side of the mill which adjustments are frequent and necessary. These disadvantages result in production of substantial quantities of off gauge sheet material which must be scrapped.

Accordingly, the primary purpose and object of this invention is to provide an improved means for controlling rolling mill pressure which eliminates or substantially reduces many of the disadvantages of the prior art techniques.

Another object of this invention is to provide a novel means for controlling rolling mill pressure whereby the pressure would automatically be maintained constant at a given setting regardless of changes in such factors as oil film thickness, and roll diameter.

Another object of this invention is to provide a novel means for instantaneously adjusting overall rolling mill pressure and for increasing pressure on one side of a rolling mill while simultaneously and proportionately decreasing pressure on the other side.

It is a further object of this invention to provide a rolling mill device wherein novel means are employed for quickly and efficiently adjusting the pressure exerted by the rolling mill on the material being rolled and wherein the pressure remains constant at a given setting of the device regardless of changes in oil film thickness and roll diameter.

It is a further object of this invention to provide a rolling mill device wherein novel means are employed for quickly and efficiently adjusting the overall pressure exerted by the rolling mill and for adjusting the pressure on one side of the rolling mill while simultaneously and proportionately decreasing pressure on the other side.

These and other objects and advantages of the instant invention will be apparent from the following description thereof when taken in conjunction with the accompanying drawings.

In accordance with this invention there is provided a novel means of adjusting and controlling rolling mill pressure directly through a single acting hydraulic cylinder and piston assembly provided in conjunction with roll supporting chock blocks for at least one of the rolls. This hydraulic cylinder and piston assembly is provided either in conjunction with or in place of the conventional screw down assembly on each side of the rolling mill. Accordingly, increasing the pressure within a cylinder and piston assembly increases the pressure on its respective side of the mill. A hydraulic system embodying the principles of this invention is provided to operate these hydraulic cylinder and piston assemblies. The cylinder and piston assemblies and mill roll chock blocks are allowed to float vertically within the limits of the cylinder and piston assembly structure. Therefore, as speed and rolling conditions change the rolling pressure is maintained constant and compensating adjustments by the mill operator are not required. The hydraulic system contemplates the use of a suitable means for forcing fluid into the cylinder and piston assembly such as a positive displacement type pump of conventional design driven by a suitable prime mover. The fluid is then bled from said assembly to a reservoir connected to the suction of the pump. A suitable pressure regulating valve is provided for regulating the fluid pressure in each piston and cylinder assembly. Suitable means are provided for interconnecting the controls for said regulating valves such as a gear on the control shaft of each regulating valve intermeshing with each other, and a suitable handle affixed to at least one control shaft. In this way the pressure in one of the cylinder and piston assemblies may be increased while simultaneously proportionately decreasing the pressure in the other. A second pressure regulating valve is provided to control equally the pressure through both first mentioned regulating valves whereby the pressure in each piston and cylinder assembly may be increased or decreased an equal amount while maintaining the same pressure differential set as described above.

A detailed discussion of a specific means for carrying out this invention will be described in conjunction with the following drawings wherein:

FIGURE 3 is a fragmentary side elevational sectional view partially in section showing the upper part of a conventional mill housing disclosing one arrangement for mounting the cylinder and piston assemblies where a conventional screw down assembly is employed.

FIGURE 4 is a schematic representation of a hydraulic system for adjusting the mill rolls in accordance with this invention.

FIGURE 5 is a side view of two pressure relief valves illustrating a preferred means for interconnecting the controls of these valves according to this invention.

FIGURE 6 is a plan view of the two interconnected pressure relief valves of this invention as shown in FIGURE 5 and FIGURE 7 is an enlarged sectional view of one of the two interconnected pressure relief valves of this invention taken along the line 7—7 of FIGURE 6.

Figure 1:
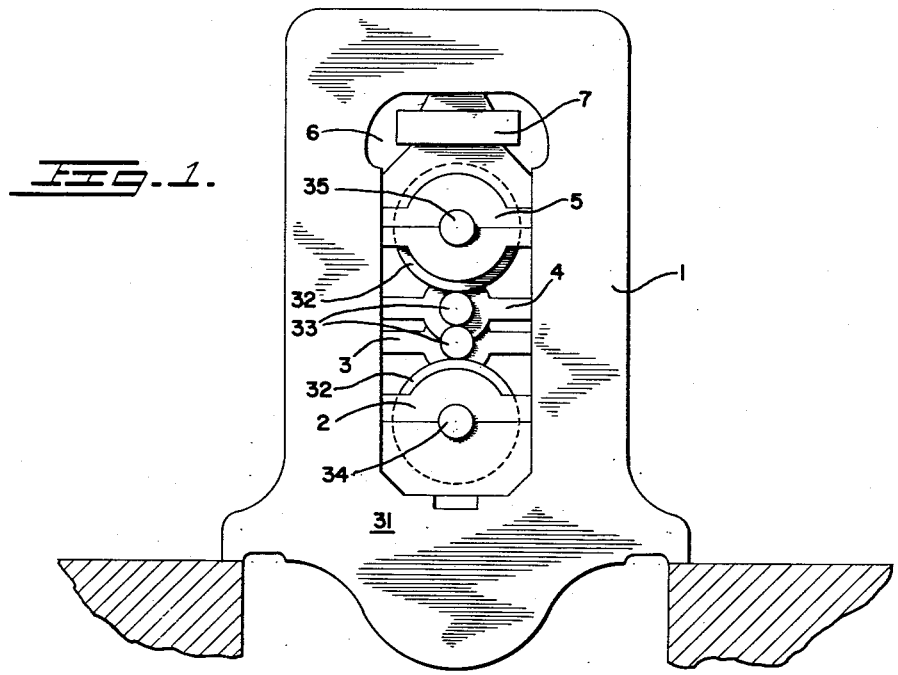
FIGURE 1 is a side elevational view of a conventional 4 high roll assembly with the hydraulic cylinder and piston assembly of this invention attached thereto.
Figure 2:
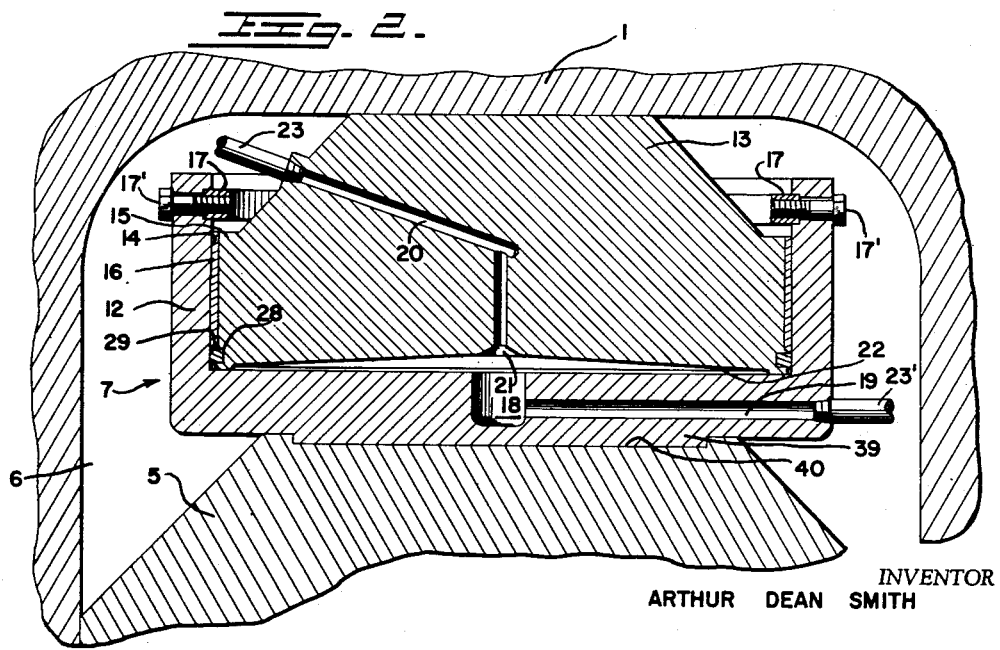
FIGURE 2 is a fragmentary side elevational sectional view of the upper part of a conventional mill housing disclosing one arrangement for mounting the cylinder and piston assemblies where a conventional screw down assembly is not employed.

With further reference to the drawings in which the same reference numerals have been applied to various corresponding parts and with particular reference to FIGURE 1, a conventional rolling mill assembly 31 is shown wherein a housing 1 is provided with windows 6 which accommodate the lower and upper chock blocks 2 and 5 for the back up rolls 32. Only one side of rolling mill assembly 31 is shown and since both sides are identical, a description of one will suffice for both. The mill is further provided with working rolls 33 which cooperate with the back up rolls 32, these rolls 33 being mounted in chock blocks 3 and 4. The necks 34 of the bottom backing roll 32 are mounted in lower chock blocks 2 at the bottom of the windows 6 and the necks 35 of the upper backing roll 32 are mounted in the upper chock blocks 5 which are vertically adjustable in the upper portion of windows 6 so as to obtain the desired setting of the rolls. Disposed between the upper portion of each of windows 6 and each upper chock block 5 on each side of housing 1 is a hydraulic cylinder and piston assembly 7. While hydraulic cylinder and piston assembly 7 is shown between the upper chock block and the upper portion of window 6 it is within the scope of this invention to position said assembly 7 between the lower chock block 2 and the lower portion of window 6 on each side of rolling mill assembly 31. Assemblies 7 may be employed either with conventional screw down assemblies as shown in FIGURE 3 or may be employed without such assemblies as shown in FIGURE 2. Where assemblies 7 are employed with a conventional screw down assembly, each screw down is comprised of a threaded device such as a screw 9 which can be driven through conventional gearing 36 and 37 by a screw down motor (not shown) manually controlled through the medium of a control switch (also not shown).

It will be further observed from a reference to FIGURE 3, that the means for holding each pressure adjusting screw 9 in a proper vertical plane and at the proper height depending upon the amount of pressure to be applied to the rolls consists of a hollow cylinder 10 mounted within a cylindrical shaft or opening 44 in the housing 1 by means of a flat, annular retaining plate 45, the latter plate being held in position through the medium of a series of stud bolts 46 and nuts 47.

The hollow interior 48 of cylinder 10 is provided with threads, which engage and coact with the threaded portion 49 on the adjusting screw 9 and serve to hold the adjusting screw 9 at the proper predetermined height, when this screw is turned to give the mill rolls their proper setting.

All of the aforesaid elements with the exception of the cylinder and piston assemblies 7 are more or less conventional parts of a standard rolling mill.

The hydraulic cylinder and piston assemblies 7 serve as the means for applying initial pressure to the rolls to obtain the desired roll setting. There is one such assembly for each side of the mill assembly 31. Since they are both similarly constructed a description of one will suffice for both.

With reference to FIGURES 2 and 3, it will be seen that each assembly 7 comprises an open top cylinder 12. The outside, bottom surface of this cylinder is provided with a central annular shoulder 39 which rests in an annular hollowed out portion 40 in the upper part of chock block 5. Located within each cylinder 12 is a piston 13 having a concave bottom and a suitable annular clearance between the outer periphery of piston 13 and the inner periphery of cylinder 12. A suitable annular groove 28 may be provided in piston 13 to accommodate suitable gasket material 29 to make close contact with the walls of cylinder 13 thereby preventing leakage. While groove 28 is shown in piston 13 alternatively it may be provided in the inner periphery of cylinder 12. Between the outer periphery of piston 13 and the inner periphery of cylinder 12 a suitable bushing 16 may be provided. Suitable means such as a split annular ring 17 may be affixed by suitable means such as bolts 17' in the upper portion of cylinder 12 to limit the upward travel of piston 13. In the bottom of cylinder 12 an opening 18 is provided in open communication with a passage 19 which is provided to permit fluid to be pumped into the space 22 of cylinder and piston assembly 7 through tubing 23'. A second opening 21 is provided in piston 13 in open communication with a passage 20 which in turn is connected to the hydraulic system through tubing 23 and provides a means to permit fluid to bleed out of cylinder and piston assembly 7. Thus the pressure applied to the rolls on a given side of rolling mill assembly 31 through the respective chock block 5 may be increased or decreased by increasing or decreasing the fluid pressure applied in space 22 in the respective cylinder and piston assembly 7.

The structure of cylinder and piston assembly 7 as above described is equally applicable to use either without a screw down assembly as shown in FIGURE 2 or with a screw down assembly as shown in FIGURE 3. Where a screw down assembly is not employed as shown in FIGURE 2 the upper portion of piston 13 is flat. However, where a screw down assembly is employed as shown in FIGURE 3, the upper portion of piston 13 is provided with a suitable recessed opening 24 within which the end of pressure screw 9 fits. A suitable thrust bearing block 25 is located within the recessed opening 24 in contact with the bottom of recessed opening 24. Thrust bearing block 25 is provided with a concave spherical top which contacts the convex spherical end of screw 9. The end of screw 9 has a peripheral groove 26 within which a retaining ring 27 is adapted to fit, ring 27 being split and bolted into position by suitable bolts 43 after piston 13 is placed in contact with the end of screw 9.

The operation of cylinder and piston assemblies 7 is as follows: Fluid from the hydraulic system flows into the hydraulic cylinder and piston assembly 7 through tubing 23', passage 19 and opening 18 to the space 22 between the end of the piston 13 and the cylinder 12. This fluid fills space 22 and continuously bleeds out through opening 21, passage 20 and tubing 23. As the oil pressure through tubing 23' increases, the pressure within the cylinder and piston assembly increases thus forcing cylinder 12 downwardly in turn forcing the clock block 5 downwardly thereby increasing the pressure on the metal between the rolls. Similarly a decrease in the pressure through tubing 23' decreases the pressure on the metal passing through the rolls. While the enclosed drawing illustrates one type of specific cylinder design, it is to be distinctly understood that this invention is not to be limited to such specific hydraulic cylinder designs and other such cylinders embodying the principles and employing the hydraulic system of this invention may be employed.

Having now described the mechanical and structural features of a conventional rolling mill and of a hydraulic cylinder and piston assembly to be employed with this invention, a hydraulic system to effect operation will be described in detail.

With reference to FIGURE 4, a preferred hydraulic system wherein the pressure regulating valves 63 and 64 are positioned on the outlet side of the cylinder and piston assembly 7 will be described.

As previously mentioned, the hydraulic system of this invention comprises means for circulating fluid through the system under pressure such as a positive displacement type pump of conventional design driven by a suitable prime mover. For purposes of this invention it is preferred to employ two pumps 50 and 50' suitably coupled to a prime mover such as an electric motor 53. For this purpose either twin pumps which are readily available on the market or two separate pumps may be employed. In either case the suction of said pumps may be connected together and through a line 51 to a suitable reservoir 52. Fluid from the discharge of the pumps 50 and 50' passes through lines 65 and 66 respectively to passage 19 of each cylinder and piston assembly 7. From each cylinder and piston assembly 7 the fluid passes through passage 20, lines 69 and 70 to pressure relief valves 63 and 64 respectively. The respective discharge openings from valves 63 and 64 are connected through lines 71 and 80 to fluid return line 87 which passes to reservoir 52. A suitable check valve 78 may be provided in line 87 to maintain a full hydraulic system. By the use of a 5–10 pound spring in such a check valve, hydraulic fluid will be prevented from siphoning out of the system. A suitable cooler 92 may also be provided in line 87 to cool the fluid prior to entering reservoir 52.

With reference to FIGURE 7 a preferred valve structure for valves 63 and 64 will be described. While FIGURE 7 is indicated as a sectional view along the line 7—7 of valve 63, it is to be distinctly understood that valve 64 has the identical construction. Each valve 63 and 64 will generally comprise a suitable housing 93 having inlet openings 94 and 95 leading to a chamber 121 for connection to the pressure side of the system and a discharge opening 96 for discharging excess fluid when the pressure in openings 94 and 95 and chamber 121 exceeds the valve setting. For application to this invention one of the openings 95 is generally plugged off. Discharge opening 96 is closed by a piston 97 contacting a valve seat 119 when the pressure in inlet opening 94 and chamber 121 is below the valve setting. Piston 97 has an enlarged portion or flange 98 which closely fits within a cylindrical opening 99 in the upper portion of housing 93. Directly above the flange 98 of piston 97 a small cylindrical chamber 100 will be found. A suitable orifice 101 is provided through flange 98 to provide communication between chamber 121 and chamber 100. A second and somewhat larger orifice 102 is provided between chamber 100 and a small chamber 103 in the uppermost portion of the valve. Where a modified conventional valve structure is employed chamber 103 may have a threaded opening 104 provided therein. For purposes of this invention said threaded opening 104 should be closed off by a suitable plug 105.

Chamber 103 leads to a pilot valve 109 comprising a suitable valve seat 106 having seated thereagainst a conical control plug 107. Control plug 107 is maintained on valve seat 106 by the pressure of an adjustment spring 108 located in a chamber 114. The end of spring 108 opposite the end in contact with control plug 107 is contacted and held in position by a threaded rotatable control stem 88. Suitable packings 110 are provided to seal the control stem 88. A suitable packing nut 111 is threadedly engaged in a threaded opening 112 in the upper portion of housing 93. Packing nut 111 has a threaded opening therein which engages the threads 113 of rotatable control stem 88. Accordingly rotation of control stem 88 in one direction will increase the spring pressure on control plug 107 while rotation of control stem 88 in the opposite direction will decrease the pressure on control plug 107. For purposes of this invention a suitable opening 122 is provided in the upper portion of housing 93 in open communication with the chamber 114 on the spring side of control plug 107. By tapping vent opening 122 a suitable pipe 115 may be connected by threading into opening 122. A valve as shown in FIGURE 7 and described above may be obtained by modification of a conventional balanced piston type pressure relief valve such as a valve manufactured by the Vickers Company and designated as CT–06–B. Such a valve generally has an opening 116 in the lower portion of chamber 114 in open communication with a chamber 117 which contains a spring 118. The pressure of spring 118 normally maintains piston 97 against valve seat 119 in opening 96. For purposes of this invention opening 116 is plugged by a suitable plug 120. The conventional Vickers CT–06–B valve does not normally have a vent opening 122 in the upper portion thereof and accordingly for purposes of this invention such an opening is provided therein by suitable means such as drilling.

Operation of the valve shown in FIGURE 7 and described above is as follows:

Where the pressure in inlet opening 94 is less than the sum of the pressure exerted by adjustment spring 108 and the pressure in chamber 114, which is the same as the pressure in pipe 115, the piston 97 will be maintained in the closed position by spring 118. Liquid flowing in through inlet opening 94 flows through chamber 121, orifice 101 into chamber 100, and creates the same pressure on the top of the piston flange 98 as is present on the bottom. The area on both top and bottom of the piston flange 98 is the same and accordingly the piston is hydraulically balanced in the closed position. The liquid will also flow through orifice 102 to the chamber 103 which is maintained closed by the combined pressures of adjustment spring 108 and the fluid pressure in chamber 114. Control plug 107 is maintained closed until the pressure in opening 94 and chamber 121 exceeds the combined pressure of adjustment spring 108 and the hydraulic pressure in chamber 114. When the pressure in inlet opening 94 exceeds the sum of these two pressures excess fluid will flow through inlet opening 94 and chamber 121 through orifice 101, chamber 100, second orifice 102, chamber 103 around control plug 107 and out pipe 115. Since the orifice 101 is smaller than the orifice 102, the pressure in chamber 100 will drop below that of chamber 121 and inlet opening 94. The valve piston 97 will then become unbalanced and begin to open since the pressure is greater on the bottom of the piston flange 98 than on the top and the liquid is unable to enter the chamber 100 through orifice 101 as rapidly as it passes through the orifice 102. This causes the piston 97 to move upwardly away from valve seat 119 and open up a path through which the liquid in opening 94 and chamber 121 will discharge through opening 96 and relieve the excessive pressure. This discharge prevents further increase in pressure and the valve thus limits the pressure in inlet opening 94 to the desired setting. After the excessive pressure is thus relieved from pressure control plug 107, causing control plug 107 to be reseated and as liquid slowly enters chamber 100 through orifice 101, the piston spring 118 will push the piston 97 downwardly to close the discharge opening 96. For use in the circuit of this invention shown in FIGURE 4, inlet opening 94 of valve 63 is connected to line 69, discharge opening 96 is connected to line 71, and vent opening 122 is connected to line 72. For valve 64 the inlet opening 94 is connected to line 70, the discharge opening 96 is connected to line 80 and the vent opening 122 is connected to line 73.

For proper operation in the system of FIGURE 4, pumps 50 and 50' are designed to deliver a pressure in excess of the maximum rolling mill pressure desired. Accordingly, the pressure in inlet opening 94 and chamber 121 of each valve 63 and 64 would be greater than the back pressure against control plug 107 for any desired setting when piston 97 is seated in valve seat 119. Thus the valve piston 97 will adjust itself in relation to valve seat 119 such that it will discharge just enough fluid through outlet or opening 96 to maintain the pressure in chamber 121, inlet or opening 94 and accordingly the corresponding cylinder and piston assembly 7 substantially equal to the sum of the spring pressure 108 and the hydraulic pressure in chamber 114 and pipe 115.

By a suitable gear arrangement as illustrated in FIGURES 5 and 6 rotatable control stems 88 and 89 are suitably interconnected whereby with a single hand wheel it is possible to simultaneously increase the pressure of adjustment spring 108 of one valve while decreasing the pressure of adjustment spring 108 of the other valve. This is accomplished by the use of suitable gears 81 and 82 mounted on the respective control stems 88 and 89 of each valve 63 and 64 and intermeshing with each other. A suitable hand wheel may be mounted on at least one control stem. As illustrated in FIGURES 5 and 6 a hand wheel 84 is mounted on control stem 88 while a hand wheel 85 is mounted on control stem 89. Before engaging gears 81 and 82 the pressure relief valves 63 and 64 are set at some predetermined pressure below the minimum pressure at which the rolling mill would operate. For this purpose a suitable disengaging mechanism could be employed which would permit independent adjustment of each valve 63 and 64 when desired. One means for accomplishing this would be to provide a sliding mounting for either gear 81 or 82. With the adjustment spring pressure on each valve 63 and 64 set approximately identical the gears 81 and 82 are engaged whereby turning of either hand wheel 84 or 85 will cause the adjustment spring pressure on one valve to increase while the adjustment spring pressure on the other valve will simultaneously and proportionately decrease thus controlling the balance between the two cylinder and piston assemblies 7 and acting as a lining up control. That is to say, when the hand wheel is rotated in one direction the pressure in the cylinder and piston assembly 7 on one side of the mill would be increased while pressure in said cylinder and piston assembly 7 on the other side of the mill would be decreased thereby simultaneously differentially adjusting the pressure on each side of the sheet being rolled. With this arrangement such changes in adjustment are effected almost instantaneously.

While operation with control stems 88 and 89 geared together is an important feature of this invention it is to be understood that gears 81 and 82 may be disengaged whereby each cylinder and piston assembly 7 may be independently adjusted.

With reference to FIGURE 4, the vent lines 72 and 73 on each pressure relief valve 63 and 64 are connected together by a suitable T 74 from which a line 75 passes to a suitable conventional pressure relief valve 76. An example of such a valve suitable for use with this invention is manufactured by the Vickers Company and designated CT–06–C by the manufacturer. A drain line 77 from relief valve 76 is connected to line 87 which is connected to reservoir 52 as above described. The pressure relief valve 76 has a mechanical control which may be operated by rotating a suitable hand wheel 86 whereby the fluid pressure on the inlet of valve 76 may be controlled. This in turn controls the pressure in lines 72 and 73 and in the chamber 114 of each valve 63 and 64.

Since as mentioned above the pressure in inlet opening 94 of each valve 63 and 64 is substantially equal to the pressure exerted by adjustment spring 108 plus the hydraulic pressure in chamber 114, adjustment of hand wheel 86 causes the pressure of the fluid entering valves 63 and 64 through respective inlet openings 94 to be increased or decreased an equal amount. Accordingly the pressure in lines 69 and 70 and in each cylinder and piston assembly 7 is also increased or decreased an equal amount while the difference in pressure between the inlet openings 94 in the two valves 63 and 64 and in lines 69 and 70 determined by the difference in the settings of the adjustment springs 108 of each valve 63 and 64 is maintained constant.

Operation of the above described hydraulic system is as follows: First gears 81 and 82 are disengaged. Next a predetermined equal pressure is established on the adjustment spring 108 of each of the pressure relief valves 63 and 64 which pressure would be lower than the anticipated rolling pressure, for example 200 p.s.i. Gears 81 and 82 are then engaged and handle 86 of the relief valve 76 is turned to increase the pressure in lines 75, 72 and 73 and in each chamber 114 a sufficient amount to bring the total of adjustment spring pressure plus the pressure in chamber 114 of each valve 63 and 64 to the rolling mill pressure. Since the pressure in the inlet opening 94 of each valve 63 and 64 substantially equals this total the pressure in lines 69 and 70 and in each cylinder and piston assembly 7 will be increased to the desired rolling mill pressure. As the pressure to relief valve 76 is increased or decreased the pressure on both sides of the mill rolls is correspondingly equally increased or decreased. By turning either hand wheel 84 or 85 on one of the geared together relief valves 63 or 64 a pressure differential is created between the two sides of the mill.

Assume for example adjustment springs 108 are set at 200 p.s.i. and valve 76 is set to produce a hydraulic pressure of 100 p.s.i. in chamber 114. The pressure in lines 69 and 70 and in both cylinder and piston assemblies 7 would then be 200 plus 100 equals 300 p.s.i. By turning one of the hand wheels 84 or 85 on one of the geared together relief valves 63 or 64, the settings of adjustment springs 108 may then be 150 p.s.i. on one and 250 p.s.i. on the other leaving 100 p.s.i. differential. The pressure in one of the cylinder and piston assemblies 7 would accordingly be 150 plus 100 equals 250 p.s.i. while the pressure in the other would be 250 plus 100 equals 350 p.s.i., also a 100 p.s.i. differential. This 100 p.s.i. differential will be maintained on the system regardless of the setting of valve 76. If, for example valve 76 was adjusted to produce a pressure of 750 pounds in chambers 114, the pressure on one side of the mill would then be 150 plus 750 equals 900 p.s.i. and the pressure on the other side would be 250 plus 750 equals 1000 p.s.i. maintaining the 100 pound differential established by the adjustment of the geared together valves 63 and 64.

Advantageous embodiments of this invention have been shown and described and it is to be distinctly understood that various changes may be made therein without departing from the spirit and scope thereof as defined by the following claims wherein what is claimed is:

1. In a hydraulic control system for a rolling mill provided with a pair of cooperating rolls, one of which comprises a floating back up roll and the other of which comprises a work roll, said back up roll being movable with respect to said work roll so as to vary the pressure exerted between said rolls and separate hydraulically operated expandable piston and cylinder assemblies acting on the respective ends of said back up roll, means for actuating said piston and cylinder assemblies in such a fashion that equal and opposed pressures can be continuously applied to each piston and cylinder assembly, said actuating means including separate and oppositely acting pressure regulating valves for independently regulating the fluid pressure on each of said piston and cylinder assemblies, control means for each of said valves, means interconnecting the control means of said valves, the control means acting simultaneously on each of said valves such that pressure in one of the piston and cylinder assemblies can be increased while pressure in the other of said piston and cylinder assemblies is proportionately decreased and vice versa, a further pressure regulating valve connected to both of said first-mentioned pressure regulating valves, each of said first-mentioned pressure regulating valves comprising a housing, an inlet for said housing connected to a piston and cylinder assembly and an outlet for the housing for discharging fluid, a flanged piston in the housing movable toward and away from said outlet, the lower portion of said flanged piston being adapted to contact the seat of said outlet to close said outlet, spring means in the housing adapted to exert pressure on and tending to maintain said flanged piston in contact with said seat, said housing being further provided with a chamber disposed above the flange of the flanged piston, said flanged piston having an orifice passing through the flange of the piston and providing communication between said outlet and said chamber of the housing, said housing being further provided with a spring operated pilot valve disposed in an orifice connecting the chamber of the housing to the inward side of the pilot piston of the pilot valve, said latter orifice having a larger diameter than the orifice in the flange of the flanged piston, an adjustment spring in the housing adapted to exert the pressure on the pilot valve and tending to maintain said pilot valve closed, means for regulating the pressure exerted by said adjustment spring, a vent means in the housing and disposed on the outlet side of said pilot valve, said vent means providing the only path for discharging fluid passing through said pilot valve and for opening said pilot valve when the fluid pressure at the inlet of the housing exceeds the pressure of the adjustment spring plus the pressure in said vent means, and said second-mentioned regulating valve being directly connected at all times to the vent means of both of said first-mentioned pressure regulating valves such that a change in the setting of the second-mentioned pressure regulating valve produces an equal change in vent pressure on both of said first-mentioned pressure regulating valves and the pressure in turn on each cylinder and piston assembly will be increased or decreased an equal amount while maintaining constant any pressure differential between the piston and cylinder assemblies established by operation of said first-mentioned regulating valves.

2. A hydraulic control system as defined in claim 1 wherein the rolling mill includes a screw down means provided with a pressure screw and wherein one of said piston and cylinder assemblies is interposed between the pressure screw of the screw down means and the floatingly mounted back up roll.

References Cited in the file of this patent

UNITED STATES PATENTS

| | | |
|---|---|---|
| 1,669,550 | Biggert | May 15, 1928 |
| 2,027,283 | McFadden | Jan. 7, 1936 |
| 2,034,939 | Biggert | Mar. 24, 1936 |
| 2,149,367 | Sedlon et al. | Mar. 7, 1939 |
| 2,267,380 | Tyler | Dec. 23, 1941 |
| 2,380,973 | Kopp | Aug. 7, 1945 |
| 2,388,820 | Bonnell | Nov. 13, 1945 |
| 2,545,921 | Goodwillie et al. | Mar. 20, 1951 |
| 2,552,892 | Garrett | May 15, 1951 |
| 2,569,034 | Auer | Sept. 25, 1951 |
| 2,691,326 | McArn | Oct. 12, 1954 |
| 2,698,023 | Eckman | Dec. 28, 1954 |
| 2,734,407 | Smith | Feb. 14, 1956 |
| 2,784,729 | Schoffel | Mar. 12, 1957 |

FOREIGN PATENTS

| | | |
|---|---|---|
| 647,606 | Great Britain | Dec. 20, 1950 |